United States Patent [19]

Yen et al.

[11] Patent Number: 5,348,662
[45] Date of Patent: Sep. 20, 1994

[54] PROCESS FOR REMOVING HEAVY METALS FROM AQUEOUS SOLUTIONS

[75] Inventors: Jeffrey H. Yen, Gloucester, N.J.; Richard C. Spung, Crosby, Tex.

[73] Assignee: Elf Atochem North America, Inc., Philadelphia, Pa.

[21] Appl. No.: 61,790

[22] Filed: May 13, 1993

Related U.S. Application Data

[63] Continuation-in-part of Ser. No. 882,777, May 14, 1992, abandoned.

[51] Int. Cl.$^5$ ............................................. C02F 1/62
[52] U.S. Cl. ............................ 210/717; 210/721; 210/724; 210/726; 210/737; 210/911; 210/912; 423/87; 423/92; 423/602; 423/617
[58] Field of Search ............... 210/717, 721, 724, 725, 210/726–728, 737, 911–914; 423/42, 43, 47, 617, 87, 602, 92

[56] References Cited

U.S. PATENT DOCUMENTS

| | | | |
|---|---|---|---|
| 3,575,853 | 4/1971 | Gaughan et al. | 210/725 |
| 4,201,667 | 5/1980 | Liao | 210/721 |
| 4,566,975 | 1/1986 | Allgulin | 210/711 |
| 4,622,149 | 11/1986 | Devuyst et al. | 210/717 |
| 4,959,203 | 9/1990 | Knoer et al. | 423/602 |
| 5,024,769 | 6/1991 | Gallup | 210/721 |
| 5,093,007 | 3/1992 | Domvile | 210/713 |
| 5,114,592 | 5/1992 | Schuster et al. | 210/667 |
| 5,126,116 | 6/1992 | Krause et al. | 423/42 |
| 5,137,640 | 8/1992 | Poncha | 210/724 |
| 5,262,063 | 11/1993 | Yen | 210/724 |

FOREIGN PATENT DOCUMENTS 49-039953  4/1974  Japan .

Primary Examiner—Peter A. Hruskoci

[57] ABSTRACT

In the process of removing heavy metals from aqueous solutions (groundwater) by precipitation of a salt thereof, an oxidizing agent is optionally used to increase the valence of said metal, and a precipitation-enhancing agent is added to maximize particle size of the precipitate and to facilitate its separation from said solution.

16 Claims, No Drawings

PROCESS FOR REMOVING HEAVY METALS FROM AQUEOUS SOLUTIONS

BACKGROUND OF THE INVENTION

This is a continuation-in-part of application Ser. No. 07/882,777 filed May 14, 1992. This invention concerns a method for the removal of heavy metals, e.g. arsenic, tin, lead and the like, from aqueous solutions in which they are dissolved, by the precipitation of the metal in the form of an insoluble salt. More particularly, it concerns a process for the removal of heavy metals from contaminated groundwater wherein the heavy metal is precipitated from solution in the form of its salt, the precipitate having a maximized particle size to facilitate separation.

PRIOR ART

It is known to remove heavy metals from water by precipitation of their salts. For example, U.S. Pat. No. 4,959,203, discloses the precipitation of copper arsenate from a solution of copper sulfate to which a water-soluble arsenate solution is added and the resulting solution neutralized to precipitate copper arsenate. In that disclosure, Example 1 teaches the addition of sulfuric acid to a copper-arsenic-containing solution to adjust the pH to 2.2. Impurities precipitated by this procedure were removed prior to raising the pH with caustic to precipitate the copper arsenate. Other processes wherein cupric nitrate, cupric chloride, zinc nitrate and other water-soluble metal salts will react with the heavy metal ions in aqueous solutions may be used to form metal salts for precipitation at or near neutral pH. These processes form precipitates which at times are difficult to filter such that undesirably long filtering times and filter clogging are encountered with the precipitation processes. As a result, treated effluents may sometimes contain relatively high heavy metal contaminants.

STATEMENT OF INVENTION

This invention concerns a process for the removal of at least one heavy metal from groundwater initially substantially free of sulfuric acid and contaminated with dissolved heavy metal by forming a water-soluble salt of said heavy metal in solution at an acid pH by the addition of an inorganic water-soluble salt of a metal from Group Ib, IIb or VIII of the Periodic Table, and then adjusting the pH upward to precipitate said salt of said heavy metal, the salt formation and precipitation carried out at a temperature within the range from above 30° C. to below the boiling point of the reaction solution, said process comprising, optionally, prior to forming the heavy metal salt, treating said groundwater with an oxidizing agent in an amount sufficient to convert any low valence heavy metal to a higher valency and to oxidize any organic contaminants therein, before, during or after forming the heavy metal water-soluble salt, adding a precipitation-enhancing agent to said groundwater in an amount sufficient to enlarge the average particle size of the heavy metal salt when precipitated, said precipitation-enhancing agent being present in the groundwater in crystalline form during the precipitation of said heavy metal salt.

DETAILED DESCRIPTION OF THE INVENTION

The process of this invention is useful for the removal of heavy metals from groundwater and to facilitate the filtration of precipitates of the heavy metal salts produced in the process. It is particularly useful for the removal of arsenic dissolved in groundwater (or wastewater) which may also contain organic chemical impurities which impede precipitation of heavy metals by acting as chelating agents. The contaminated groundwater of this invention broadly includes industrial wastewater containing heavy metal(s). These aqueous solutions also contain dissolved inorganic impurities including, for example, calcium and magnesium. Because of its exposure to the earth, typical groundwater always contains calcium ions.

The invention is an improvement in the process of removing one or more heavy metals from groundwater contaminated therewith by forming a water-soluble salt of a heavy metal in solution at an acidic pH by the addition to the groundwater of an inorganic water-soluble salt of a metal from Group Ib, IIb or VIII of the Periodic Table, and then adjusting the pH of the solution upward to precipitate the heavy metal salt; the improvement in this process includes an optional step and a critical step to produce the desired improvement in filterability of the precipitated product and to enhance the removal efficiency of heavy metals from groundwater.

Optionally, the groundwater to be treated is oxidized, prior to salt formation, to convert any heavy metal of lower valency to a higher and more reactive metal ion. For example, trivalent arsenic, if present, will be converted to pentavalent arsenic by the oxidizing agent. This preoxidation will also serve to oxidize any organic impurities in the aqueous solution which could interfere with the precipitation of the formed metal salts. Organics which act as chelating agents to bind the heavy metal and prevent precipitation are especially in need of oxidation. Oxidizing agents are used which will accomplish the intended purpose and not themselves interfere with the relevant reaction or precipitation, in the amounts employed. That is, the oxidizing agents should not raise the pH of the metal-containing solution to the degree that precipitation will occur on the addition of the salt-forming agent. Oxidizing agents which are useful for this process include, for example, ozone, hydrogen peroxide, sulfuric acid, nitric acid, hydrochloric acid, and the like. These agents are used in amounts sufficient to convert lower valent heavy metals to a higher valency and to oxidize organic contaminants sufficiently to prevent their interference with precipitation by the metal salt on pH adjustment in the process. In general, amounts of sulfuric acid or nitric acid as oxidizing agents to be added to the heavy metal-containing aqueous solution range from 1 g/L to 5 g/L; preferably 1.5 to 2.5 g/L based on the volume of water in the aqueous solution to be treated.

Of course, if all heavy metal present in the solution is in its higher valency form and no organics are present in the solution, the oxidizing step may be omitted.

A precipitation-enhancing agent is critical to the present invention to provide improved and more rapid filtration of the formed precipitate and to enhance the removal efficiency of heavy metals. The step of mixing this agent with the solution maximizes the particle size and can be accomplished either before, during or after the heavy metal is converted to the water-soluble salt at acid pH. The precipitation-enhancing agents include, for example, calcium sulfate, arsenic trioxide, calcium arsenate, and cupric oxide. Any inorganic salt with a crystal structure similar to that of the precipitate can also be used as the precipitation enhancing agent. Sulfuric acid can be used to form calcium sulfate in situ since typical groundwater contains some calcium. If wastewater to be treated does not contain calcium or the groundwater contains insufficient calcium for in situ preparation of a precipitation-enhancing agent in a sufficient quantity, calcium oxide, calcium hydroxide, calcium-magnesium carbonate or calcium phosphate may be added to the groundwater for this purpose. It is preferred that the calcium to arsenic weight ratio be between 0.1 and 1 to 1, more preferably between 0.2 and 0.6 to 1 for the in situ preparation of calcium sulfate used to enhance precipitation of the heavy metal salt. Equivalent ratios of calcium to other heavy metals are also used to enhance their precipitation.

The precipitation-enhancing agents are usually dissolved in the groundwater when added thereto, or when formed in situ, and precipitated in their crystalline form either below the pH or at the same pH at which the heavy metal salt begins to precipitate. Alternatively, the precipitation-enhancing agent, e.g. cupric oxide, may remain in crystalline form (undissolved) when added to the groundwater. In any case, the precipitation-enhancing agent must be present in the groundwater in crystalline form during the heavy metal salt precipitation.

To facilitate description of this invention, arsenic will be used hereinafter to represent heavy metals which also include, for example, lead and tin. These materials will exist in ionic form in the aqueous solution.

Arsenic is removed from groundwater containing it by reacting the arsenic in solution with an inorganic water-soluble metal salt wherein the metals are those of the Groups Ib, IIb, and VIII of the Periodic Table. Preferred salts are cupric nitrate, cupric chloride, copper sulfate, zinc nitrate, ferric chloride, ferric nitrate and the like which form water-soluble metal arsenates in solution at an acid pH, e.g., from about 1 to 2. The arsenate is precipitated by adjusting the pH of the aqueous solution upward such that at a pH of about 3 and above, the arsenate will precipitate as a solid in finely-divided form. The amount of copper or equivalent salt introduced into the arsenic-containing solution is determined by the arsenic content of the solution and, based on a stoichiometric ratio of metal to arsenic, will be from about 1.1 to about 2:1 and preferably from about 1.1:1 to 1.7:1. On addition of the water-soluble salt to the arsenic solution, the pH of the solution will be lowered to about 1–2 and is generally maintained between 1 to 3, preferably about 2 during the reaction stage. The reaction stage is preferably carried out for 5 minutes to two hours, more preferably about 10–20 minutes, at a temperature ranging from above 30° C., preferably about 45° C., to below the boiling point of the reaction solution.

The precipitation stage, including filtration is preferably and advantageously carried out within the same temperature range as recited above for the reaction stage.

The pressure at which the process is operated is not critical, ambient or atmospheric being preferred.

The reaction is generally carried out with agitation in either a batch or continuous system, e.g., continuous stirred tank reactor. It is preferable to have a ditched bottom reactor with an agitator diameter-to-reactor vessel diameter of 0.4 to 0.55. Agitation during the reaction will be mild with mostly axial flow and low shear force to avoid shearing of precipitate particles when precipitation occurs. Examples of the agitators include, but are not limited to hydrofoil agitators, such as Lightnin A310 and A315, and profiles agitators, such as Mixel Profile propellers TT, TTP and TTM. It is preferable to locate the injection ports for inorganic metal salt slightly above the agitator blades. It is also preferred to have a tubular anchor close to the bottom of the reactor in order to avoid the accumulation of precipitate at this location.

Adjustment of the pH of the aqueous reaction system upward is accomplished by adding an alkali or alkaline earth metal hydroxide, ammonia or equivalent basic material to the mixture. The concentration of the basic material preferably ranges from about 150 to 500 g/L, preferably about 300 g/L. Addition of the basic material is preferably made slowly to bring the pH toward or above neutral over an extended period, e.g., 10 to 60 minutes.

Following precipitation of the metal arsenate, the solids of the reactor slurry are usually separated in a conventional liquid/solid separator, e.g., a filter press. However, this process is also beneficial for other forms of separation such as decanting and centrifugation.

EXAMPLES

The following examples are used to demonstrate this invention. Table 1 below lists a typical composition of groundwater treated in the accompanying examples. The initial pH of the groundwater ranged from 5.5 to 5.7.

TABLE 1

| Chemical | Concentration (wt.) |
| --- | --- |
| Arsenic | about 4,000 ppm |
| Calcium | about 1,000 ppm |
| Chloroform | 160 ppb |
| Chlorobenzene | 94 ppb |
| Alpha BHC* | 490 ppb |
| Beta BHC | 95 ppb |
| Gamma BHC | 740 ppb |
| Delta BHC | 410 ppb |

* - benzene hexachloride
ppm = parts per million
ppb = parts per billion

EXAMPLE 1 (Comparative)

500 g of groundwater (See Table 1) was added to a stirred glass reactor and the temperature of the reactor slowly raised to about 55°–60° C. (130°–140° F.) at which it was maintained through the precipitation step. 10.2g of cupric nitrate [Cu(NO$_3$)$_2$.2.5H$_2$O ] was added to the heated reactor and the reactor pH dropped to about 2. 11.2 mL of 25 wt. percent sodium hydroxide were slowly added to the reactor over a period of 20 minutes during which the pH of the reactor mix reached 7. The stirrer was turned off. The resulting slurry of small particle size took over one (1) hour to filter and provided filtrate having 0.76 ppm (wt.) arsenic. Arsenic removed from the groundwater was calculated to be 99.8%.

EXAMPLE 2

500 g of groundwater (See Table 1) was added to a stirred glass reactor and the temperature in the reactor slowly raised to about 55°–71° C. (130°–150° F.) at which it was maintained through the precipitation step. 3.4g of concentrated sulfuric acid (>95%) was added to the reactor and the pH of the solution in the reactor dropped to about 1. 10.2g of cupric nitrate was introduced to the reactor solution and the pH of the resulting mix dropped further to 0.6. 4.9g of sodium hydroxide (NaOH) granulars were slowly added into the reactor over a period of 23 minutes during which time the pH of the reactor increased to 4.5. The stirrer motor was turned off and the precipitate (copper arsenate) showed excellent sedimentation characteristics. Within 2-3 minutes following termination of agitation, the sedimentation interface dropped rapidly and the precipitate slurry occupied only 30% of the volume of the reactant mix, i.e., the reactant mass consisted of 70% (vol.) clearly supernatant and 30% precipitate slurry, compared to less than 10% clear supernatant after 2-3 minutes following agitation termination in Example 1. Filtration was accomplished in 10-15 minutes providing a filtrate of 0.63 ppm arsenic and over 99.98% arsenic removal from the groundwater. Compared to Example 1, it is evident from this example that the addition of sulfuric acid enhances the filterability of the precipitate and the arsenic removal efficiency.

EXAMPLE 3

3500 g of groundwater (See Table 1) was introduced into a stirred glass reactor (4500 ml.) and the temperature in the reactor was slowly raised to about 55°-71° C. (130°-150° F.) at which it was maintained through the precipitation stage. 13.1g of concentrated sulfuric acid (>95%) was added to the solution in the reactor dropping the solution pH to about 1.5. 71.3g of cupric nitrate was then added to the reactor solution to drop the pH further to 1.3. 31.9g of NaOH granulars were slowly added to the reactor over 19 minutes raising the pH to 7.5. After agitation (stirring) was turned off, the precipitate (copper arsenate) showed excellent sedimentation characteristics. Within a minute after the agitator was turned off, the sedimentation interface dropped rapidly and the precipitate slurry occupied only about 65% of the volume of the reactant mass, i.e., 65% precipitate and 35% clear supernatant compared to less than 10% clear supernatant in Example 1 observed following 2-3 minutes after termination of agitation. Within 3 minutes of agitation termination, the precipitate slurry occupied only 40% of the volume of the reactant mass and the filtration rate was quite rapid. The arsenic content of the filtrate was measured at 0.997 ppm.

EXAMPLE 4

Eight hundred grams of the groundwater (with typical chemical contents of Table 1) was added into a stirred glass reactor. The reactor temperature was maintained at ambient temperature (about 70° F.). 3.0 grams of concentrated sulfuric acid (>95%) was added into the reactor and the reactor pH dropped to about 1.7, followed by the addition of 19.7 grams of cupric nitrate salt, $Cu(NO_3)_2.5\ H_2O$. The reactor pH further dropped to 1.6. Caustic solution was slowly added into the reactor and the reactor pH was raised to 6.1. Half of the resulting product was filtered with a filter paper and was found to be rather difficult to filter. The filtrate was found to have over 50 ppm arsenic.

The second half of the resulting product was heated up to 120° F. for fifteen minutes. The slurry was relatively easier to filter using the same grade filter paper compared to the first half of the product. The filtrate contained 26.1 ppm arsenic.

EXAMPLE 5

500 g of groundwater (See Table 1) was added to a stirred glass reactor and the reactor was maintained at ambient temperature (about 80° F.) through the precipitation step. 3.4g of concentrated sulfuric acid (>95%) was added to the reactor and the pH of the solution in the reactor dropped to about 2.3. 19.9g of cupric nitrate containing 14% Cu by weight was introduced to the reactor solution and the pH of the resulting mix dropped further to 2.0 20.7g of sodium hydroxide (NaOH) granulars were slowly added into the reactor over a period of about 15 minutes during which time the pH of the reactor increased to 7.8. The filtrate had an arsenic concentration of 45.6 ppm. representing an arsenic removal efficiency of 98.9%. The average particle size of the precipitate was 43.7 μm.

EXAMPLE 6

Sixty gallons of the groundwater (See Table 1) was added into a steam-jacketed stirred stainless steel reactor. The reactor temperature was maintained at about 150°-160° F. throughout the reaction. 230 grams of concentrated sulfuric acid (>95%) was added into the reactor, followed by the addition of 2,000 grams of cupric nitrate solution containing 0.26 grams Cu per ml. The reactor pH was dropped to 2.4. Caustic solution was slowly added into the reactor and the reactor pH was raised to 7.6. The reactant was filtered and the filtrate was found to have 0.204 ppm arsenic. The average particle size of the precipitate was 66.2 μm.

Compared to Examples 4 and 5, it is evident that the efficiency of arsenic removal and the average particle size of precipitate can be affected by reaction and precipitation temperatures. Elevated temperature is preferred throughout the reaction and precipitation stages.

EXAMPLES 7-11

In Examples 7, 8 and 11, groundwater was treated at elevated temperature in accordance with the procedure of Example 6 except for the modifications noted in Table 2 below. Examples 9 and 10 were conducted as follows:

Example 9

One thousand mls. of groundwater containing 2000 ppm arsenic was added to a stirred glass reactor. The water was heated to 130° F. and stirred slowly. 12.6 mls aqueous copper nitrate solution was added to the solution (a copper: arsenic ratio of 1.8:1). The pH dropped from 6.1 to 1.5. One quarter gram of black cupric oxide powder was added to the reactor. There was no change in pH or temperature. Twenty five percent caustic soda solution was dripped into the reactor, at the rate of 20 mls/hour. After 30 minutes, 10.6 mls were added and the pH was 7.1.

EXAMPLE 10

The experiment reported in Example 9 was repeated up to the introduction of the caustic soda solution. Then, twenty-five percent caustic soda solution was dripped into the beaker at the rate of 40 mls/hour. After 14 minutes, 10.2 mls had been added and the pH was 7.1.

The average particle size obtained in the experiments of Examples 7-11 are reported in Table 2 below.

TABLE 2

| Process Conditions | Example No. | | | | |
|---|---|---|---|---|---|
| | 7 | 8 | 9 | 10 | 11 |
| As* in Groundwater (ppm) | 4000 | 2000 | 2000 | 2000 | 2000 |
| Precipitation Enhancing Agent | None | None | CuO** | CuO** | $H_2SO_4$ |
| Neutralizing Agent | NaOH | $NaCO_3$ | NaOH | NaOH | NaOH |
| Avg. Particle Size of Precipitate ($\mu$m) | 37.3 | 19.9 | 54.5 | 61.3 | 66.2 |

*Arsenic
** Black Cupric Oxide Powder

It is evident from the above results that the average particle size of the precipitate is enlarged by the use of sulfuric acid (to form calcium sulfate in situ) or cupric oxide.

Furthermore, elevated reaction and precipitation temperatures can improve the arsenic removal efficiency and the average particle size of the precipitate.

EXAMPLE 12

100 gallons of groundwater as typified in Table 1 was added to a steam-jacketed stirred stainless steel reactor. The groundwater contained 1,910 ppm of arsenic, by weight. The reactor temperature was maintained at about 140°–150° F. throughout the reaction and mild stirring was continuous. 383.5 grams of concentrated sulfuric acid (>95%) was added to the reactor followed by the addition of 4.3L of cupric nitrate solution (0.263g. Cu/mL) in four steps. A small sample taken from the reactor was neutralized with caustic and the resulting precipitate was milky and difficult to filter. An additional 296 g. of concentrated sulfuric acid (>95%) was added into the reactor followed by 471 g. of lime (CaO) and 220 g. of concentrated sulfuric acid. A small sample was then taken from the reactor and neutralized with caustic. The precipitate settled easily and showed a better particle size distribution compared to the first sample. The reactant in the reactor was neutralized with caustic to a pH of 7. The precipitate was easily filtered through a filter press clearly demonstrating the importance of the in situ prepared precipitation-enhancing agent in the reactant.

We claim:

1. A process for the removal of at least one heavy metal selected from the group consisting of arsenic, tin and lead from ground water initially substantially free of sulfuric acid and contaminated with dissolved said heavy metal, said process comprising forming a water-soluble salt of said heavy metal in solution at an acid pH by the addition to said groundwater of an inorganic water-soluble salt of a metal from Group Ib, IIb or VIII of the Periodic Table, and then adjusting the pH upward to precipitate said salt of said heavy metal, the salt formation and precipitation carried out at a temperature within the range from above 30° C. to below the boiling point of the reaction solution, optionally, prior to forming the heavy metal salt, treating said groundwater with an oxidizing agent in an amount sufficient to convert any low valence said heavy metal to a higher valency and to oxidize any organic contaminants therein, before, during or after forming said water-soluble salt of said heavy metal adding a precipitation-enhancing agent selected from the group consisting of calcium sulfate, arsenic trioxide, calcium arsenate and cupric oxide to said groundwater in an amount sufficient to enlarge the average particle size of the heavy metal salt when precipitated, said precipitation-enhancing agent being present in the groundwater in crystalline form during the precipitation of said heavy metal salt, and separating the precipitate from said groundwater.

2. The process of claim 1 wherein the oxidizing agent is ozone, hydrogen peroxide, sulfuric acid, nitric acid or hydrochloric acid.

3. The process of claim 2 wherein said oxidizing agent is sulfuric acid.

4. The process of claim 1 wherein said precipitation-enhancing agent is calcium sulfate or cupric oxide.

5. The process of claim 4 wherein said calcium sulfate is formed in situ by the addition of sulfuric acid to the groundwater.

6. The process of claim 5 wherein calcium oxide, calcium hydroxide, calcium-magnesium carbonate or calcium phosphate is dissolved into the groundwater to provide additional calcium to react with sulfuric acid.

7. The process of claim 1 wherein said heavy metal is arsenic.

8. The process of claim 7 wherein said water-soluble salt is formed by reacting the arsenic in the groundwater with the inorganic water-soluble salt at a temperature ranging from about 45° C. to below the boiling point of said groundwater.

9. The process of claim 8 wherein said inorganic salt of a metal is cupric nitrate, cupric chloride, copper sulfate or zinc nitrate.

10. The process of claim 9 wherein said precipitation-enhancing agent is calcium sulfate which is formed in situ by the addition of sulfuric acid to the groundwater.

11. The process of claim 10 wherein the pH is adjusted upward by the addition of an alkali metal hydroxide to said groundwater.

12. The process of claim 10 wherein the pH adjusting step and salt precipitation is carried out at a temperature within the range of about 45° C. to below the boiling point of said groundwater.

13. The process of claim 12 wherein the precipitate is filtered to separate solids at a temperature within the precipitation temperature range.

14. The process of claim 10 wherein calcium oxide, calcium hydroxide, calcium-magnesium carbonate or calcium phosphate is dissolved into the groundwater to provide additional calcium to react with sulfuric acid.

15. The process of claim 8 wherein the pH adjusting step and salt precipitation is carried out at a temperature within the range of about 45° C. to below the boiling point of said groundwater.

16. The process of claim 11 wherein the precipitate is filtered to separate solids at a temperature within the precipitation temperature range.

* * * * *